United States Patent
Sobue

Patent Number: 4,907,097
Date of Patent: Mar. 6, 1990

[54] ORIGINAL READING APPARATUS
[75] Inventor: Ikuo Sobue, Kawasaki, Japan
[73] Assignee: Canon Kabushiki Kaisha, Tokyo, Japan
[21] Appl. No.: 134,162
[22] Filed: Dec. 17, 1987
[30] Foreign Application Priority Data
Jan. 9, 1987 [JP] Japan .................. 62-1812[U]
[51] Int. Cl.$^4$ ............................ H04M 1/40
[52] U.S. Cl. ........................ 358/461; 358/464
[58] Field of Search ........... 358/293, 288, 286, 292, 358/280, 464, 465, 466, 461

[56] References Cited
U.S. PATENT DOCUMENTS
4,578,711 3/1986 White et al. ............... 358/282
4,622,594 11/1986 Honjo et al. ............... 358/293
4,717,963 1/1988 Koizijmi .................... 358/293

Primary Examiner—Edward L. Coles, Sr.
Attorney, Agent, or Firm—Fitzpatrick, Cella, Harper & Scinto

[57] ABSTRACT

A document reading apparatus incorporating shading correction features has an illumination device for illuminating a document. Drive components move the document relative to the illumination device. Image pickup circuitry converts the image of the document irradiated by the illumination device into an electrical signal. A first stationary reference member is disposed on a reverse side with respect to the document and provides a first reference light to the image pickup circuitry when irradiated by the illumination device. A second stationary reference member is disposed on a front side with respect to the document and provides a second reference light to the image pickup circuitry when irradiated by the illumination device. Control circuitry corrects the electrical signal of the document image from the pickup circuitry in accordance with one of the first and second reference lights picked up by the pickup circuitry.

9 Claims, 1 Drawing Sheet

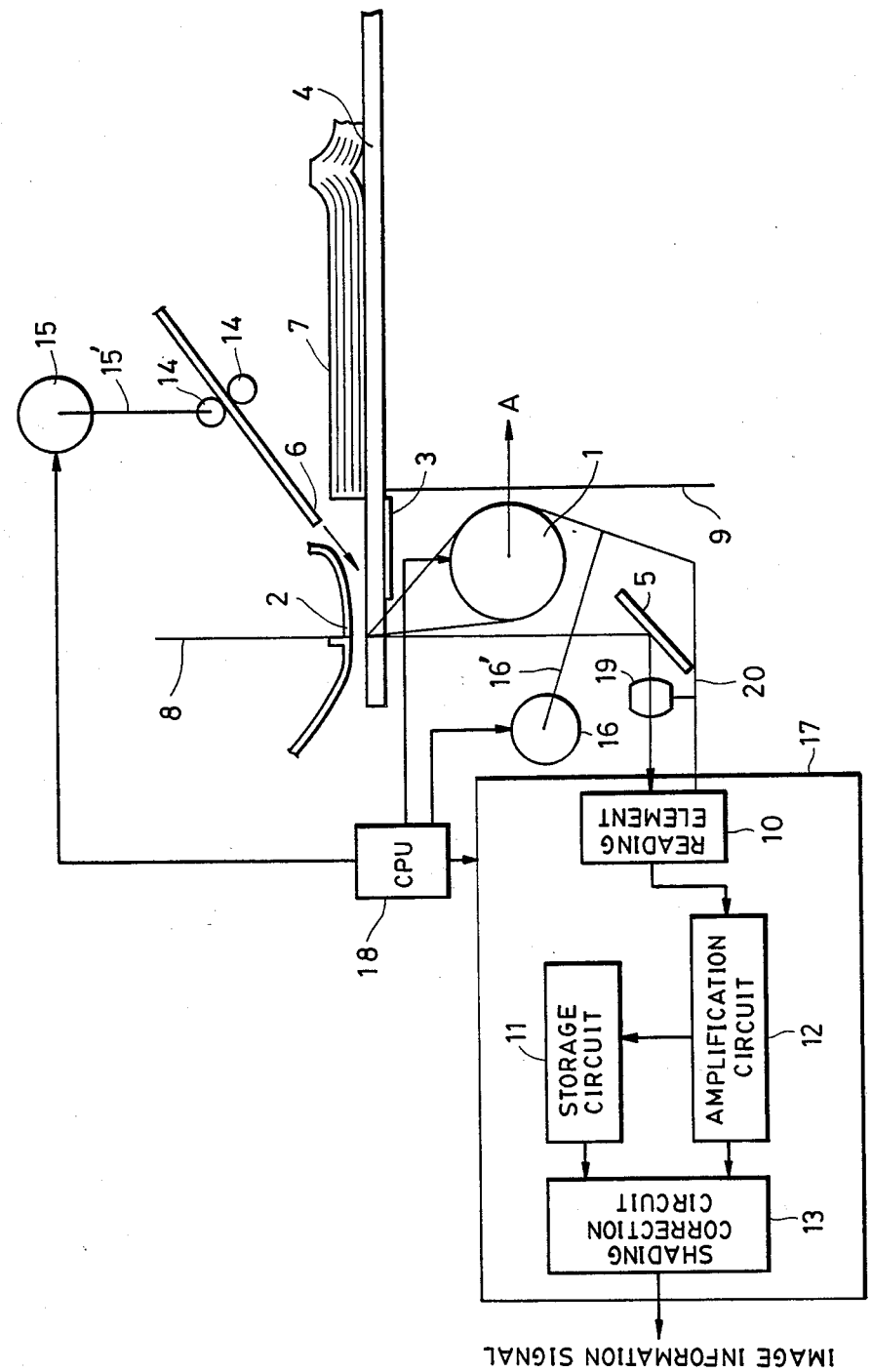

ORIGINAL READING APPARATUS

BACKGROUND OF THE INVENTION

1. Field of the Invention

The present invention relates to an original reading apparatus for use in a copying machine, an image signal transmitting equipment, or the like.

2. Description of the Prior Art

A typical example of an apparatus of the type mentioned above is an apparatus in which an original is illuminated by a light source such as a fluorescent lamp, and the light reflected from the original is condensed by a condenser and is projected onto a reading element such as a CCD. Such an apparatus, however, encounters a problem in that the light source, such as a fluorescent lamp, inevitably has some variation in the quantity of light emitted therefrom between the longitudinal end portions and the central portion of the lamp. Further, a beam of light which has passed through the condenser lens has a light distribution such that the quantity of light at the center thereof is large while that at both ends is small, this characteristic being known as the Cosine$^4$ Law. As a result, the distribution of light projected onto the reading element becomes non-uniform. This phenomenon is known as "shading" and may affect resulting image signals.

In order to avoid any distortion of image signals due to shading, it has been common practice to adopt shading correction. For this purpose, a known original reading apparatus is provided with a white plate disposed at a position at which a moving original is read, and shading correction is conducted by illuminating the white plate with a light source, detecting the light reflected from the white plate by means of the reading element, and, by using this detection signal as a reference signal, electrically correcting the signal output from the reading element which corresponds to the image on the original.

With such a known apparatus, the white plate is disposed at a position corresponding to the reverse side of an original, such as a sheet of paper having an image, as it moves through the original reading position, and the reference signal for shading correction is obtained by illuminating the white plate before the apparatus starts to read the original, and detecting the light reflected from the white plate by means of the reading element. In such a known apparatus, if it is necessary to read a stationary original which is, for instance, provided by one or more pages of a book placed motionless on an original table, shading correction is performed before the start of reading of the stationary original, in a manner similar to that as described as above. That is, the light source is fixed at the original reading position, the white plate is illuminated with the light source, and a reference signal for shading correction is obtained. Thereafter, the light source is moved to a position enabling reading of the stationary original.

This known apparatus, however, fails to form any reference signal for shading correction in some cases. In particular, when it is necessary to continuously read a plurality of original sheets, when the quantity of light emitted from the light source fluctuates within a relatively short period because of factors such as low temperature, or when the light source lamp remains turned on for a long period during the reading of a lengthy original, it is impossible to obtain a reference signal during the reading of the original by using the white plate disposed on the reverse side of the original. In these cases, therefore, the known apparatus may form image signals distorted by shading, thus providing images of inferior quality.

An original reading apparatus may be arranged as described below when it is necessary to read a stationary original, such as a page of a book, placed motionless on the original table. The light source is first turned on while it is fixed at a stop position, and, after the quantity of light emitted from the light source has become stable, the white plate is illuminated by the light source to form a reference signal for shading correction. Thereafter, the light source is moved to read the stationary original.

Such an arrangement is, however, disadvantageous because the movement of the light source can be started only after the reference signal has been formed, thus necessitating a long period for the entire reading operation.

In order to cope with the first mentioned problem, U.S. Pat. No. 4,614,976 proposes providing, in addition to a white plate disposed on the reverse side of the original, a white plate which is movable to a desired position over the side of the original facing the light source. With this arrangement, the additional white plate can be moved, when necessary, to an original illuminating position to enable the formation of a reference signal for shading correction.

In accordance with this proposal, however, a mechanism has to be provided for moving the movable white plate, thus causing an increase in production cost and in the size of the entire apparatus.

SUMMARY OF THE INVENTION

Accordingly, it is an object of the present invention to provide an original reading apparatus which is capable of performing shading correction accurately, both when reading a moving original and when reading a stationary original.

According to the present invention, there is provided an original reading apparatus comprising: original conveying means for conveying an original having an image through a first illuminating location; an original table on which an original having an image is placed motionless at a second illuminating position; a reference member located at a position which is different from the first and second illuminating locations; a light source which in a first operation mode is positioned motionless at a predetermined position to illuminate the original moving through the first illuminating location, whereas in a second operation mode the light source is moved to illuminate the original placed motionless at the second illuminating location, the light source also being adapted to illuminate the reference member; reading means adapted to convert light information into electric signals, the reading means being such that in the first operation mode the reading means forms a first electric signal corresponding to the image of the original moving through the first illuminating location, whereas in the second operation mode the reading means forms a second electric signal corresponding to the image of the original placed motionless at the second illuminating location, the reading means being also such that the reading means forms a third electric signal corresponding to light from the light source which is reflected from the reference member; and shading correction means which in the first operation mode performs shading correction on the first electric signal on the basis of the third electric signal, whereas in the second operation mode the shading correction means performs shading correction on the second signal on the basis of the third electric signal.

The above and other objects and features of the present invention will become apparent from the following description.

BRIEF DESCRIPTION OF THE DRAWING

The single FIGURE is a schematic illustration of essential parts of an original reading apparatus in accordance with one embodiment of the present invention.

DESCRIPTION OF THE PREFERRED EMBODIMENTS

The preferred embodiments will be described hereunder with reference to the single drawing. An original reading apparatus in accordance with one embodiment of the present invention has a light source 1 for illuminating an original, a first white member 2 which acts as a reference member, and a piece of glass 4 which acts as an original table. The light source 1 comprises, for instance, a fluorescent lamp. The first white member 2, such as a white plate, is disposed in such a manner as to be on the reverse side of a moving original 6 which is read as it is moved through a first reading position (first illuminating location) denoted at 8. The moving original 6 comprises, for instance, a sheet of paper having an image, and is moved by a conveying mechanism, described later. A stationary original, which is, for instance, a page of a book 7, is placed motionless on the glass 4 at a second position (second illuminating location) and is read from a reading start position denoted at 9. The apparatus also has a mirror 5 for reflecting the light reflected from the original toward a reading element 10 through a lens 19.

The apparatus is provided with an image information signal forming circuit 17 comprising the reading element 10 which comprises for instance a CCD, an amplification circuit 12 which amplifies a signal output from the reading element 10, a storage circuit 11, and a shading correction circuit 13.

The light source lamp 1, the mirror 5, the lens 19, and the reading element 10 are rigidly fixed to a carriage 20 which is supported by a guide, not shown, and can be moved by the driving force of a motor 16 parallel to the original table 4. The conveying mechanism that moves the original sheet 6 comprises paired convey rollers 14, a motor 15 for driving the rollers 14, and a power transmission device 15' of a known type which may include gears for transmitting the driving force of the motor 15 to the rollers 14. The light source 1 and the mirror 5 can be moved by the motor 16 through a power transmission device 16' of a known type which may include a screw rod for transmitting the driving force of the motor 16 to the carriage 20.

The apparatus also includes a microcomputer 18 which controls the image information signal forming circuit 17, the motors 15 and 16, and the lamp 1 so that they operate in the manner described below.

In the illustrated embodiment, the apparatus further includes a second white member 3 which acts as another reference member. The second white member 3 is disposed at a position which is different from the reading position 8 for reading the moving original 6 and which is behind the reading start position 9 at which the reading of the stationary original 7 starts. More specifically, the second white member 3 is disposed on the reverse surface of the glass 4 forming the original table and is located between the first illuminating location 8 at which the moving original 6 is illuminated and the second illuminating location at which the stationary original 7 is placed motionless on the glass 4 to be illuminated and read from the reading start position 9.

The original reading apparatus in accordance with this embodiment of the present invention is constructed as described above. With this apparatus, the image on an original is read while the shading correction is performed in the following manner.

First, an explanation will be given with respect to operations for reading an image on a sheet of paper such as the original 6. In a normal operation of reading an original 6, the light source 1 is positioned at the position shown, before the original 6 is moved to the reading position 8. At this position, the light source 1 illuminates the first white member 2, and the light reflected from the first white member 2 is supplied to the reading element 10 through the mirror 5 and the lens 19. The reading element 10 converts the reflected light into an electric signal which is supplied through the amplification circuit 12 to the storage circuit 11 to be stored therein as data on a reference signal. The original sheet 6 is then moved by the convey rollers 14 to the reading position 8, and the light reflected from the original 6 in accordance with the image thereon is supplied to the reading element 10 in a similar manner and is converted thereby into an electric signal corresponding to the image. Distortion due to shading in the thus obtained electric signal is corrected by the shading correction circuit 13 on the basis of the data on the reference signal stored in the storage circuit 11, and it is output from the circuit 13 as an image information signal.

If the quantity of the light from the light source 1 fluctuates owing to factors such as low temperature, the operation is performed in the following manner. The reading of the original sheet 6 starts in the way described above, and, after a predetermined time has passed after the start, the movement of the original 6 is temporarily stopped by stopping the rollers 14. The light source 1 is moved in the direction of the arrow A by starting the motor 16, so as to illuminate the second white member 3. The light reflected from the white member 3 is detected by the reading element 10, and an electric signal obtained from the reading element 10 as a reference signal is stored in the storage circuit 11. Thereafter, the light source 1 is moved back to the position shown in the drawing at which the light source 1 illuminates the portion of the original 6 at the reading position 8, and the rollers 14 are driven again to move the original through the reading position 8, whereby the reading is re-started. After the reading of the original 6 has re-started, an electric signal output from the reading element 10, which corresponds to the image on the original 6, is subjected to shading correction by the shading correction circuit 13 on the basis of the data on the reference signal stored in the storage circuit 11, and is then output from the circuit 13 as an image information signal.

If the original sheet 6 is long, the operation is performed in the following manner. A reference signal for shading correction is first obtained in a similar manner as above by using the first white member 2. Thereafter, the reading is re-started and an image information signal is obtained in a similar manner. If the reading has not yet been completed after a predetermined length of the original 6 has been read after the re-start, the movement of the original sheet 6 is temporarily stopped. The light source 1 is then moved in direction A to illuminate the second white member 3. After a reference signal for shading correction has been obtained by using the second white member 3, the light source 1 is moved back to the position shown in the drawing, and the movement of the original sheet 6 is re-started, thereby re-starting the reading again.

Next, the operations of reading an original such as a page of the book 7 will be explained. The light source 1 is moved from the position shown in the drawing in direction A for a time from the point at which the light source 1 is turned on to the point the quantity of the light emitted from the light source 1 becomes stable. After the time necessary for the stabilization of the quantity of light from the light source 1 has passed, the light source 1 is moved to a position at which it is prepared for the illumination of the second white member 3. The light source 1 is therefore moved continuously to illuminate the second white member 3, and the light reflected from the second white member 3 is converted by the reading element 10 into an electric signal which is stored in the storage circuit 11 as a reference signal. The storage of the reference signal for the shading correction in the storage circuit 11 is completed by the time the light source 1 moves to the right-hand end (as viewed in the drawing) of the second white member 3, and this is immediately followed by the start of reading of the original 7 from the reading start position 9. A signal output from the reading element 10, which corresponds to the image of the original 7, is subjected to shading correction by the circuit 13 on the basis of the stored data on the reference signal. When the reading of the original 7 is completed, the light source 1 is returned to its initial position.

In brief, with the apparatus of the present invention, when it is necessary to read an original from a book 7, the light source 1 is moved toward the reading start position 9, and the second white member 3 disposed in the vicinity of the reading start position 9 is illuminated by the light source 1 to obtain a reference signal for shading correction. This arrangement enables the reading of a stationary original such as one from a book to be started immediately after the reference signal has been obtained. With this arrangement, therefore, the time required for the reading of an original of this type can be curtailed, when compared with the arrangement in which the moving of the light source 1 starts after a reference signal for shading correction has been obtained at the reading position for reading a moving original.

Although each of the first and second white members 2 and 3 should preferably have a white reflective surface, it may be a different color.

The output of the light source lamp 1 may be controlled so as to be constant, by using the signal formed by the reading element 10 in accordance with the light reflected from the white member 3.

The first white member 2 may be omitted. In this case, the second white member 3 is always used to form a reference signal for shading correction before the start of reading of the original sheet 6.

Although in the foregoing embodiment the lens 19, the reading element 10, the mirror 5, and the light source lamp 1 are all movable, the arrangement may alternatively be such that a lens and a reading element which are secured to fixed positions are used in combination with a movable lamp and a plurality of movable mirrors.

What is claimed is:

1. An original reading apparatus comprising:
   original conveying means for conveying an original to a first illuminated position;
   illuminating means for illuminating the original conveyed to said first illuminated position;
   electrical light converting means for receiving light reflected from the original;
   a first reflecting member disposed at said first illuminated position, for reflecting light from said illuminating means; and
   a second reflecting member disposed at a second illuminated position different from said first illuminated position, for reflecting light from said illuminating means, said second reflecting member being substantially the same color as said first reflecting member;
   said first and second reflecting members providing reflected light used for shading correction in reading said original.

2. An original reading apparatus according to claim 1, wherein said first reflecting member is disposed so that light reflected therefrom is used in shading correction before the original is read, while said second reflecting member is disposed so that light reflected therefrom is used in shading correction during the reading of the original.

3. An original reading apparatus according to claim 1, further including means for moving said illuminating means to a location where said illuminated position is illuminated.

4. An original reading apparatus according to claim 1, further including control means for causing said illuminating means to illuminate said second reflecting member at a time after said original has begun to be illuminated but before said original had been completely illuminated.

5. Apparatus according to claim 1, wherein said first reflecting member is used when an original is stationary, and wherein said second reflecting member is used when an original is moving.

6. An original reading apparatus according to claim 1, further including a stationary original table for supporting said original in a stationary position, and further including moving means for moving said illuminating means to read the original on said stationary original table.

7. An original reading apparatus according to claim 6, wherein said second reflecting member is disposed between said first illuminated position and said stationary position.

8. An original reading apparatus according to claim 7, wherein said second reflecting member is disposed to provide said reflected light used for shading correction when said original is disposed on said stationary original table.

9. An original reading apparatus according to claim 1, wherein said first and second reflecting members are substantially white.

* * * * *